United States Patent [19]

Wolf

[11] 4,414,461
[45] Nov. 8, 1983

[54] LASER PUMPED SUPERCONDUCTIVE ENERGY STORAGE SYSTEM

[75] Inventor: Alfred A. Wolf, Annapolis, Md.

[73] Assignee: The United States of America as represented by the Secretary of the Navy, Washington, D.C.

[21] Appl. No.: 294,873

[22] Filed: Aug. 21, 1981

[51] Int. Cl.³ .............. H02J 15/00; H01F 36/00; H01B 7/34
[52] U.S. Cl. .............. 219/121 L; 219/121 LM; 174/15 CA; 307/306; 307/245; 336/DIG. 1
[58] Field of Search .............. 219/121 L, 121 LM; 307/245, 306; 174/15 CA; 338/328; 324/71 SC; 336/DIG. 1

[56] References Cited

U.S. PATENT DOCUMENTS

| | | | |
|---|---|---|---|
| 3,701,906 | 10/1972 | Denel | 336/DIG. 1 |
| 3,711,744 | 1/1973 | Luton | 307/245 |
| 3,956,727 | 5/1976 | Wolf | 219/121 L |
| 4,032,959 | 6/1977 | Boom | 336/DIG. 1 |

OTHER PUBLICATIONS

"Superconductivity", C. W. Hewlett, *General Electric Review*, Jun. 1946, pp. 19-25.

*Primary Examiner*—B. A. Reynolds
*Assistant Examiner*—Teresa J. Walberg
*Attorney, Agent, or Firm*—R. F. Beers; L. A. Marsh

[57] ABSTRACT

A superconductive energy storage system comprising a magnetic field surrounding a superconducting coil having large currents circulating therein, cooling said coil to superconducting temperatures, starting said circulating current in said superconducting coil inductively by a small primer coil, transmitting additional energy into said energy storage system utilizing a laser beam, and retaining said energy in said energy storage system until needed.

2 Claims, 10 Drawing Figures

LASER PUMPED SUPERCONDUCTIVE ENERGY STORAGE SYSTEM

FIELD OF THE INVENTION

This invention relates to a means for storing energy for long periods of time with either no loss or very minimal losses and a method for easy retrieval of the stored energy.

DESCRIPTION OF THE PRIOR ART

Recent energy shortages have necessitated methods for developing new fuels, new energy sources, and methods for energy storage once energy is derived from any source. This invention is directed to the latter.

Energy storage presents many problems, some of which are, methods of containment, minimization of loss once contained, and retrieval of the stored energy in terms of power for some application with minimal loss in the retrieval process. For example, fuels such as hydrogen are difficult to store because of containment problems, but once contained can be easily retrieved in the same way that natural gas is retrieved. Other forms of energy, such as, liquid fuels can be easily stored but problems dealing with the action of the liquid on the container sometimes presents a problem but the most difficult part of the problem is the amount that can be stored in the available containment devices. Such containment devices are expensive and add considerably to the overall cost of the fuel. Consequently, the cleanest containment and storage ought to be electrical energy. However, this is difficult to store because of losses inherent in electrical circuits due to Joule heating because of ohmic losses.

SUMMARY OF THE INVENTION

The present invention provides a system for implementing electrical energy storage. More specifically it provides a system for storing electrical energy in a superconducting inductor. The system provides specifics for energy storage and retrieval.

The system for implementing electrical energy storage of this invention provides a magnetic primer to start the storing process and a laser pump to continue the energy build-up of large amounts of energy in the superconducting inductor for subsequent retrieval. The superconducting inductor generally eliminates losses of energy once stored and, the use of the laser as hereinafter described minimizes or substantially eliminates the energy loss that accompanies energy storage by magnetic coupling circuits.

OBJECTS OF THE INVENTION

An object of the invention is to provide a new system for electrical energy storage.

Another object is to provide a new system for electrical energy storage over a very long period of time.

Still another object is to provide a new system for electrical energy storage utilizing the superconducting nature of an inductor.

A further object of the invention is to provide a laser pump from which the energy is absorbed in the system that is operated remotely so that the energy storage can be done at a distance and one pump can be used to activate energy in many systems.

A still further object is to provide energy retrieval by using the laser beam at a different frequency thus causing a switching action or a superconducting transformer.

With these and other objects in view, as will hereinafter more fully appear, and which will be more particularly pointed out in the appended claims, reference is now made to the following description taken in connection with the accompanying drawings in which:

DESCRIPTION OF THE PREFERRED EMBODIMENTS

Figure 1:
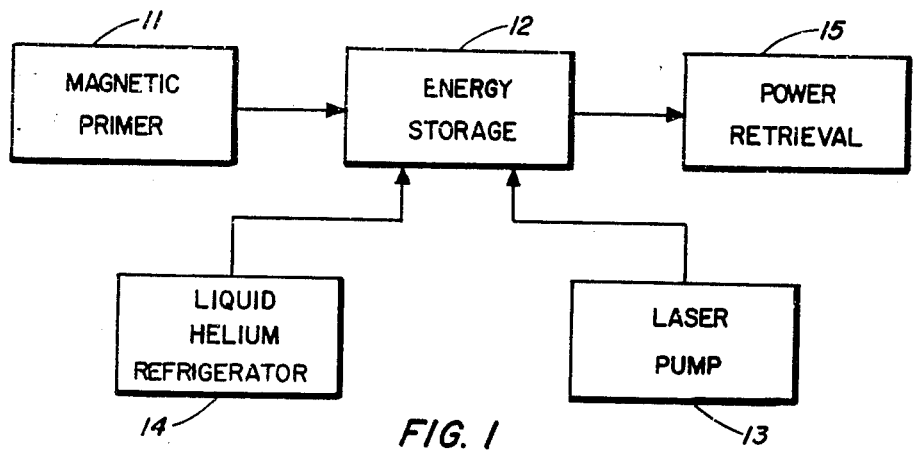
FIG. 1 shows a block diagram of the basic embodiment of the laser pumped superconductive energy storage system of the invention.

FIG. 1 illustrates in block diagram the basic embodiment of the laser pumped superconducting energy storage system of this invention. It consists of five components, namely, an energy storage device 12 (a superconducting coil means), a magnetic primer device 11 to start the system, a liquid helium refrigerator 14 for replenishment of helium boiloff, and a laser pump 13 for charging the storage element. The stored power is retrieved by a circuit that minimizes energy loss as illustrated in FIG's 8 and 9.

The energy storage device 12 consists of a superconducting inductor coil 23, a laser optical absorber window 25, and a dewar 33 containing a liquid helium bath 14a.

Figure 2:
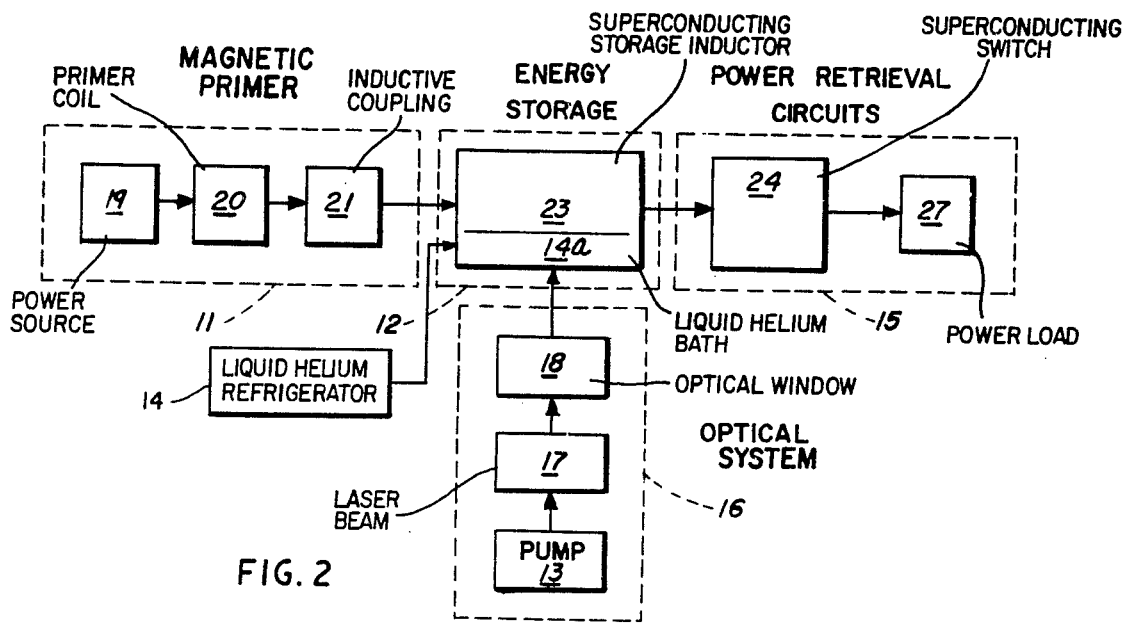
FIG. 2 shows a block diagram of a more definitive nature of the laser pumped superconductive energy storage system of the invention.
Figure 4:
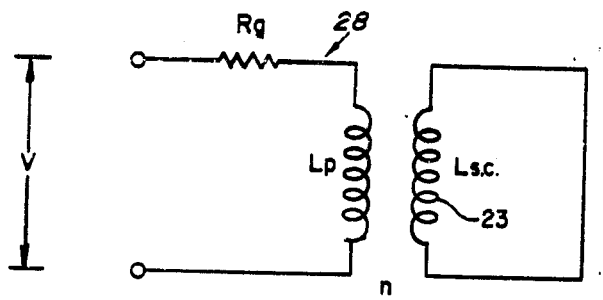
FIG. 4 illustrates a coupled circuit with secondary superconductivity of the invention.
Figure 5:
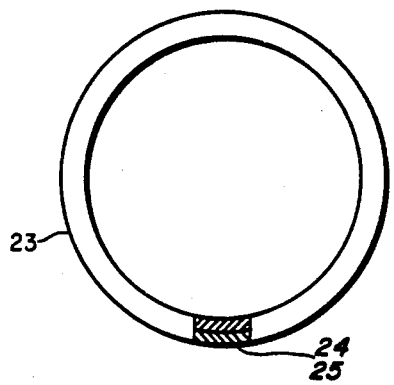
FIG. 5 shows a superconductive coil and a superconducting switch and optical absorber of the invention.

The magnetic primer device 11 starts the system via a magnetic coupling circuit 28 (shown in FIG. 4). It is well known that large amounts of energy cannot be efficiently stored in an inductive circuit using a magnetic coil, since the power source resistance in the input coil varies inversely as the square of the turns ratio. Thus, a small beginning current may be introduced using a magnetic input, but the addition of further energy is very inefficient. Using this system allows for the introduction of a small starting or initial current which may be increased using an optical system. FIG. 2 more clearly shows the device as including a power source 19 connected to a coil 20 which is inductively coupled (21) to storage coil 23. Upon a small persistent current being initiated in coil 23, the magnetic primer device 11 is switched off and laser pump 13 is switched on so that additional energy may be stored. Referring to FIG. 2, laser beam 17 carrying optical energy is generated by pump 13 and applied to superconducting switch 24 and optical absorber 25 via a low loss optical window 18 in dewar 33. Superconducting switch 24 is similar to that described in U.S. Pat. No. 3,956,727. Optical absorber 25 is similar to superconducting switch 24, but the laser is operated in such a manner that the optical absorber does not switch, but rather absorbs the light energy in a lossless manner. As photon energy from laser beam 17 is absorbed in superconducting optical absorber 25, the superelectrons gain momentum and their energy simultaneously increases. This energy increase of the supercurrent causes an increase in the magnitude of the current as shown in the thermodynamic analysis. This system must be so designed so as to prevent the current from reaching its critical value. At its critical value superconducting coil 23 quench dumps its stored energy into liquid helim bath means 14a as a useless heat loss.

The thermodynamic analysis of the system is as follows:

The Carnot efficiency, N, of the superconductor is given by the formula $$n = \frac{T2 - T1}{T2} = 1 - \frac{T1}{T2} \qquad (1)$$

wherein $\epsilon = \frac{T1}{T2}$ (2)

Rewriting equation 1 as $$n = 1 - \epsilon \qquad (3)$$

or by rearrangement $$\epsilon = 1 - n \qquad (4)$$

the quantity $\epsilon$ can be regarded as the Carnot efficiency of the refrigeration system.

In a liquid heating superconducting system T1=4° K. (liquid helium temperature) and T2=300° K. (room temperature). Thus, $$\epsilon = \frac{4}{300} = \frac{1}{75} \qquad (5)$$

which is the theoretical efficiency of the refrigeration/-liquid helium bath system. More practically, this value is at one extreme, a tenth the value given in equation (5) and, at the other extreme, a fifth of its value. Therefore, the practical efficiency, $\epsilon$ pract lies in between according to 1/10 $\epsilon$ theoretically $$\leq \epsilon \text{ pract } \frac{1}{5} \epsilon \text{ theoretically.} \qquad (6)$$

Taking an average of these extremes gives a value of efficiency as $$\epsilon_{av} = \frac{1}{500} \qquad (7)$$

This results in for every watt of power extracted from the superconductor, five hundred watts of energy must be resupplied to the helium refrigerator in order that the corresponding helium boiled off be reliquified. Such losses are therefore clearly magnified more than two orders of magnitude. Such losses are serious. Coupled circuits also introduce reflected ohmic losses in the superconductor with grave detrimental consequences as next shown.

LOSS ANALYSIS OF AN IDEAL COUPLED CIRCUIT

Figure 3:
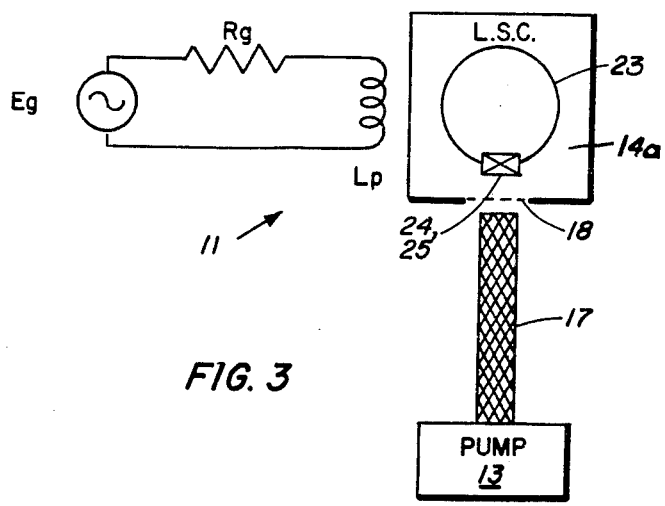
FIG. 3 shows in partial block diagram the priming, storage, and laster pumping circuits of the invention.

FIG. 3 shows and consists of a coupled circuit and a laser pump acting on an energy storage system.

FIG. 4, a schematic showing a coupled circuit with secondary superconductivity, assists in the analysis. The coupled circuit consists of a coil in the primary of inductance Lp, a resistance $R_g$ that lumps the generator resistance with the coil resistance and a superconducting (s.c.) secondary of inductance Ls.c.

In an example wherein the generator source resistance is about 0.01 ohms, the supercurrent in the secondary is about 10K amp and the turns ratio, n=100. Then $$P_{s.c.} = I^2 R_{s.c.} \qquad (8)$$

where R s.c. is the reflected resistance into the s.c. from the generator,

P s.c. is the power dissipated in R s.c. From coupled circuit theory $$R_{s.c.} = R \frac{g}{\eta z} \qquad (9)$$

using the above values $$R_{s.c.} = \frac{0.01}{(10^2)^2} = 1 \times 10^{-6} \text{ ohms} \qquad (10)$$

and $$P_{s.c.} = [10 \times 10^3]^2 \times 10^{-6} = 100 \text{ watts} \qquad (11)$$

which is dissipated in the s.c. coil. The power required for the refrigerator to reliquify the helium is $$P \text{ refrigerator} = 500 \times 10^2 \qquad (12)$$
$$= 50 \text{ Kilowatts}$$

such illustrates a serious loss. Coupled circuits do therefore present a problem.

Further, if the turns ratio is increased to lower this loss, a limitation in the maximum value of the persistent current is confronted and thus in the stored energy based upon the formula where energy stored in an inductor:

$$\epsilon \text{ inductor} = \tfrac{1}{2} L_{s.c.} I^2$$

If L s.c. is raised, some benefits can be achieved but raising the inductance also affects the turns ratio. Thus, since the energy is proportional to the square of the current and linearly proportional to the inductance, another method is thus necessary as shown by this invention.

MATHEMATICAL BASIS OF THE INVENTION

Metals both reflect and absorb light energy. This reflection/absorption characteristic depends, among other things, on the nature of the metal, the frequency of the light, and the surface conditions on which the light is incident.

In a superconductor, the energy gap is defined to be a measure of how much energy the superconductor can absorb before it returns to normal or quenches.

The energy of a single photon is given by $$\epsilon\ photon = h\gamma \quad (13)$$

The energy gap is given by the B.C.S. theory as $$\epsilon\ gap = 3.5k\ Tc \quad (14)$$

where
h = Planck's constant
γ = frequency of light
k = Boltzmann's constant
Tc = critical temperature of the superconductor
where N denotes the number of photons incident at a given instant on the metal surface, then the critical frequency, γc is given by $$\gamma_c = \frac{3.5k\ T_c}{h} \quad (15)$$

and the critical current is given by $$Ic = 2\pi H_c a \quad (16)$$

where
Hc = critical magnetic field intensity
a = radius of the conductor.
Therefore the current I in the storage device must obey the relation $$I = \sqrt{\frac{2Nh\gamma}{L}}$$

and this must not exceed Ic.
$\Phi_e$ denotes the flux energy of the light source, $\eta_m$ denotes the efficiency of absorption, and $$\Phi_e = Nh\gamma \quad (18)$$

$$\Phi_a = \eta_m Nh\gamma \quad (19)$$

and the secondary current I is given by $$I = \sqrt{\frac{2\eta_m \Phi_e}{L}}$$

in which $\gamma < V_c$. These equations yield the design parameters of the system.

The energy storage means 12 is made up of superconductor coil means 23, and the optical absorptive means 25. Coil means 23 has $n_{s.c.}$ turns according to the amount of current, thus energy, that is desired or required to be stored. Efficiency of absorption varies depending upon metal used.

An equation of inductance states $$I = \eta Ig \quad (21)$$

where I denotes the secondary or supercurrent, Ig denotes the primary current, and η denotes the turns ratio is also utilized in addition to the above equations.

The superconductor coil means 23 is made preferably of niobium—tin or niobium—zirconium which has a transition temperature well above that of liquid helium.

Figure 6:
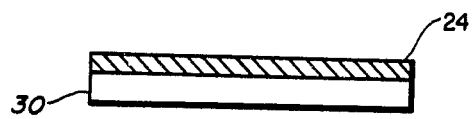
FIG. 6 shows a section of the superconducting switch and optically absorptive element of the invention.

Thus, by keeping Hc very large, large amounts of energy can be stored. The superconductor switch means 24 is made up of a deposited superconducting material with a thickness of about two to three wavelengths determined by $\lambda = C/\gamma$ where $\gamma < V_c$ and $\lambda$ is the wavelength. Switch means 24 is deposited on a highly insulating substrate as shown in FIG. 6. The switch is similar to that described in U.S. Pat. No. 3,956,727.

Figure 7:
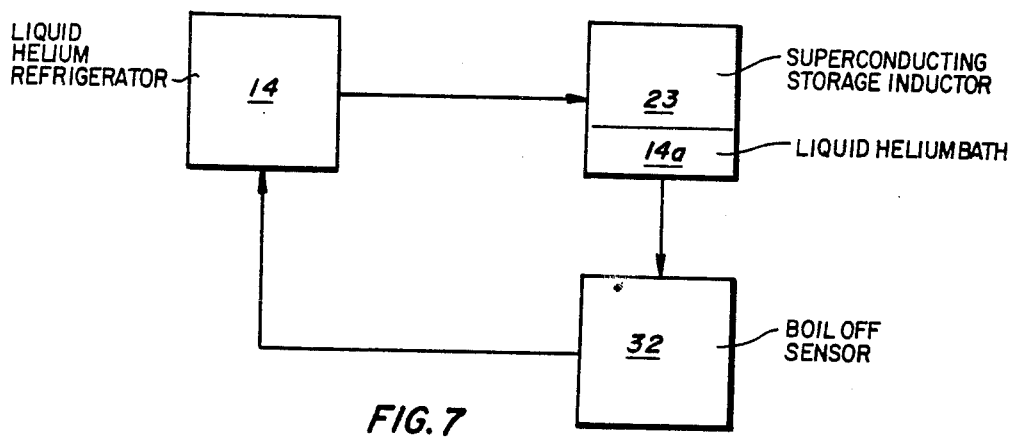
FIG. 7 illustrates in block diagram the energy storage, liquid helium refrigerator, and boiloff sensing subsystem of the invention.

The cryogenic refrigerator controls the temperature of the liquid helium bath. It consists of a standard cryogenic refrigerator or a solid state refrigerator 14, a helium boiloff sensor means 32 and liquid helium dewar 33 containing liquid helium bath 14a as illustrated in FIG. 7. The overall system is a closed feedback loop in which both liquid and gaseous helium and electrical signals constitute the loop. Helium boiloff sensor means 32 can be either a pressure measuring device or a thermal measuring device. However, the former is preferred.

Figure 8:
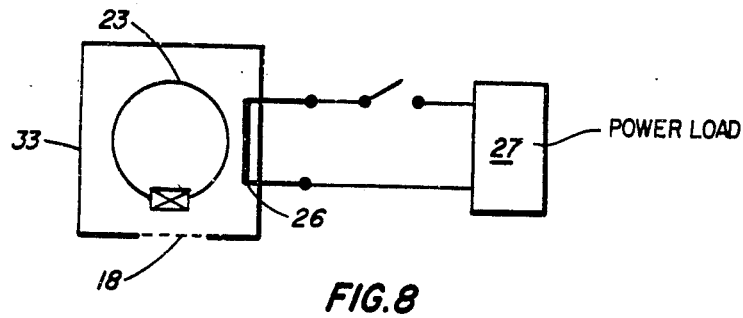
FIG. 8 shows in part block diagram and in part schematic diagram the power retrieval circuits of the invention.
Figure 9:
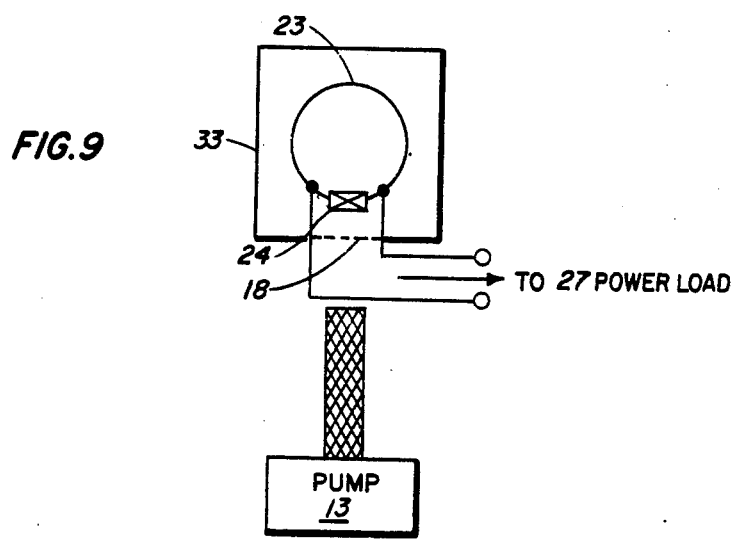
FIG. 9 shows in part block diagram and in part schematic diagram the high power dump load system of the invention.

FIGS. 8 and 9 illustrate two examples of power retrieval circuits for the overall energy storage system. FIG. 8 illustrates a superconductive d.c. transformer means 26 which may be used in place of switch 24. Such d.c. transformer means 26 is limited to the current capacity of the device. Therefore, it is useful only for low power applications or for "bleeding" small currents as required or desired. The high power dump system as shown in FIG. 9 is useful for instant dump and high power applications.

The transformer is the standard d.c. super-conducting type that involves tunneling phenomena. The superconducting switch means 24 is one that upon absorption of photons of appropriate frequency becomes highly resistive or an insulator. An open circuit or one with a resistive interface occurs so that a voltage drop is produced at switch means 24 terminals. Therefore, energy or power can then be retrieved at switch means 24.

Figure 10:
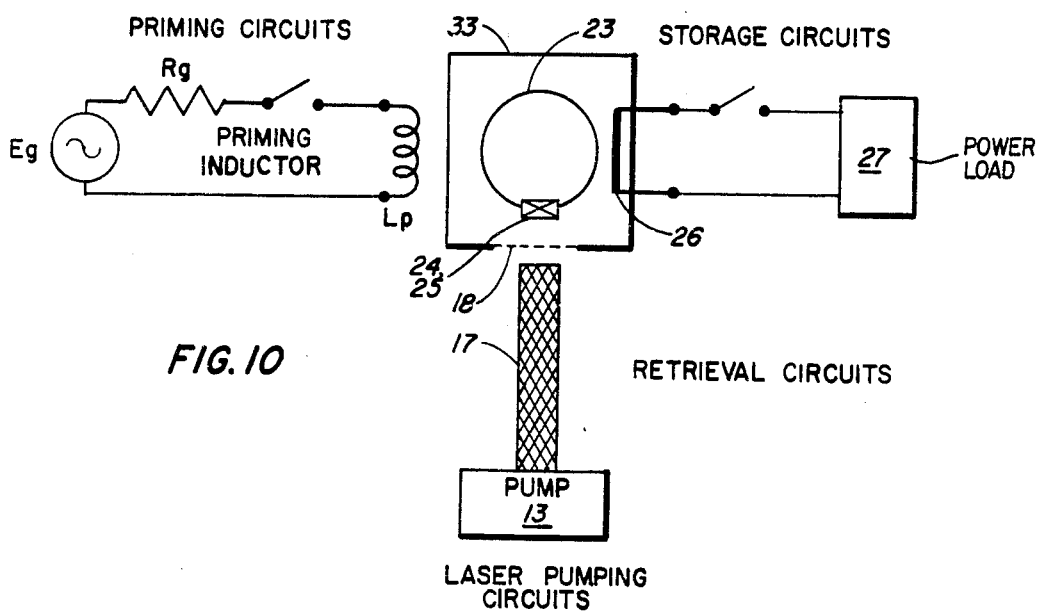
FIG. 10 shows in part block diagram and in part schematic diagram the overall laser pumped superconductive storage system circuit details of the invention.

FIG. 10 shows the overall laser pumped superconducting storage system. The retrieval circuits are shown to be a superconducting-d.c. transformer coupling to the energy storage means 12. The dump switch can be used instead if high power application is desired.

Obviously, many modifications and variations of the present invention are possible in light of the above teachings. It is therefore to be understood that within the scope of the appended claims, the invention may be practiced otherwise than as specifically claimed.

What is claimed is:

1. A superconductive energy storage system comprising:
   a superconducting coil means for carrying large currents in a closed loop;
   refrigerating means for cooling said coil means to superconducting temperatures, including a dewar containing a liquid helium bath for receiving said coil means and a liquid helium refrigerator for replenishing liquid helium in said bath;
   primer means for inductively starting a circulating current in said coil means;
   a laser means for transmitting additional energy into said coil means;
   an optical window in said dewar through which light from said laser passes;
   an optical absorber mounted on said coil means for receiving light energy from said laser means to increase the current in said coil; and
   retrieval means for retrieving energy from said coil means;

whereby said laser means is operated at a frequency below the critical frequency of said superconducting coil so that when said laser means shines on said optical absorber, the energy of said storage system and said current in said coil increase without causing normalization of the system.

2. A method of storing energy comprising the steps of:

magnetically inducing a current in a superconductive storage coil by means of a magnetic primer;

turning off said magnetic primer;

shining laser light of a frequency below the critical frequency of said coil onto an optical absorber so that the energy of the coil increases without causing normalization to produce additional current in said coil;

storing said coil cryogenically to retain the current flowing in said coil; and retrieving the energy stored in said coil.

* * * * *